(12) United States Patent
Geus et al.

(10) Patent No.: US 8,617,511 B2
(45) Date of Patent: Dec. 31, 2013

(54) PROCESS FOR PRODUCING HYDROGEN FROM METHANOL

(75) Inventors: John Wilhelm Geus, Bilthoven (NL); Marinus Franciscus Johannes Evers, Eindhoven (NL)

(73) Assignee: K.M.W.E. Management B.V., Eindhoven (NL)

( * ) Notice: Subject to any disclaimer, the term of this patent is extended or adjusted under 35 U.S.C. 154(b) by 50 days.

(21) Appl. No.: 13/203,285

(22) PCT Filed: Feb. 25, 2010

(86) PCT No.: PCT/NL2010/050095
§ 371 (c)(1),
(2), (4) Date: Oct. 10, 2011

(87) PCT Pub. No.: WO2010/098664
PCT Pub. Date: Sep. 2, 2010

(65) Prior Publication Data
US 2012/0020874 A1    Jan. 26, 2012

(30) Foreign Application Priority Data
Feb. 25, 2009   (EP) .................................. 09153660

(51) Int. Cl.
*C01B 3/02* (2006.01)
*C01B 3/16* (2006.01)

(52) U.S. Cl.
USPC ........................................ 423/648.1; 423/656

(58) Field of Classification Search
USPC ..................................................... 423/648.1
See application file for complete search history.

(56) References Cited

U.S. PATENT DOCUMENTS

| 4,789,540 | A | * | 12/1988 | Jenkins | 423/648.1 |
| 4,816,121 | A | * | 3/1989 | Keefer | 204/156 |
| 6,455,182 | B1 | | 9/2002 | Silver | |
| 2006/0154122 | A1 | * | 7/2006 | Son et al. | 429/20 |
| 2007/0000176 | A1 | | 1/2007 | Liu et al. | |
| 2007/0172416 | A1 | * | 7/2007 | Kawashima et al. | 423/648.1 |

FOREIGN PATENT DOCUMENTS

| CN | 1134316 A | 10/1996 |
| CN | 1507413 A | 6/2004 |
| CN | 101208263 A | 6/2008 |
| WO | 2004035466 | 4/2004 |

OTHER PUBLICATIONS

International Search Report, Application No. PCT/NL2010/050095, mailed May 6, 2010.
L. Yuranov et al.; "Structured combustion catalysts based on sintered metal fibre filters"; Applied Catalysis; vol. 43, No. 3; Jul. 10, 2003; pp. 217-227.
Mu et al., "Hydrogen production by methanol steam reforming in a miniature plate-type reactor", Journal of Fuel Chemistry and Technology, vol. 36, No. 3, Jun. 2008, translation of abstract.
Office Action in corresponding Chinese Application No. 201080013007.7 dated Mar. 11, 2013 and English translation of Office Action.

* cited by examiner

*Primary Examiner* — Melvin C Mayes
*Assistant Examiner* — Kenneth Vaden
(74) *Attorney, Agent, or Firm* — Renner, Otto, Boisselle & Sklar, LLP

(57) ABSTRACT

The invention is directed to a process for producing hydrogen from methanol, comprising providing at least one flow of methanol and (1) catalytically converting part of the methanol or a fuel gas with air oxygen to carbon dioxide and water, while generating heat and (2) catalytically converting the methanol or the remaining part of the methanol at elevated temperature to hydrogen and carbon monoxide, followed by conversion of the carbon monoxide with water to hydrogen and carbon dioxide, wherein the heat generated in step (1) is sufficient to produce the elevated temperature required in step (2), wherein both steps (1) and (2) are carried out in a bed of sintered metal particles, the bed of sintered metal in step (2) having a surface that is catalytically active for the conversion of methanol to hydrogen, and wherein the beds of sintered metal particles are in heat exchanging relationship.

10 Claims, No Drawings

PROCESS FOR PRODUCING HYDROGEN FROM METHANOL

The present invention is directed to a process for producing hydrogen from methanol by catalytic decomposition of methanol into hydrogen and carbon monoxide, followed by converting the carbon monoxide with water vapour into hydrogen and carbon dioxide.

Presently there is much interest to develop fuel cells for an efficient production of electrical energy. Fuel cells functioning at relatively low temperatures are the most attractive. Fuel cells based on hydrogen and oxygen (air) offer the best prospects for technical development and large scale use. The storage of hydrogen presents a problem, which is a hurdle to the large scale use of hydrogen fuel cells. Especially for mobile applications the storage of hydrogen and the problems related thereto delay the introduction with many wide-spread applications. Mobile applications involve among others, small equipments, such as laptop computers and cars. Also the local generation of electrical energy based on hydrogen for stationary applications with fuel cells is complicated. Local production of hydrogen is difficult to perform efficiently, as the scale of decentralized production is necessarily small.

The storage of hydrogen has recently been discussed extensively in Chem. Eng. News of Jan. 28, 2008. None of the three possibilities to store hydrogen for mobile applications discussed therein are attractive. The three possibilities are cryogenic storage of hydrogen at low temperature, about 30K, storage under relatively high pressure in relatively light containers and storage in the form of hydrides.

High-pressure cylinders for the storage of gas having a relatively low weight can be produced using carbon fibre reinforced materials. However, the paper clearly indicates that even relatively high amounts of thus stored hydrogen per unit of weight would be insufficient for most applications.

Cryogenic storage of liquid hydrogen at very low temperatures is also insufficient. At 20K and 1 atm. the density of hydrogen is still only 70 kg/m$^3$.

Also a lot of research has been done to store hydrogen in metal hydrides. A problem therein is the disintegration of the metal when storing and releasing hydrogen. The resulting fine metal powder is transported with the hydrogen flow. Further it is difficult to develop a metal or alloy that desorbs the hydrogen at not too high a temperature. Recently much research has been done to exotic compounds for the storage of hydrogen. However, it can be concluded that a good solution is still not available.

The attractive possibilities of the use of methanol for the storage of energy have been mentioned before. Methanol is a fluid having a boiling point of about 70° C. at atmospheric pressure and is accordingly much easier to be transported and to be stored than gaseous or liquid hydrogen. Methanol can easily be synthesized from carbon monoxide and hydrogen or from carbon dioxide and hydrogen. Production from carbon monoxide and hydrogen is presently the most used procedure, wherein hydrogen and carbon monoxide are obtained by reacting methane with steam and oxygen in very large installations. The thermal efficiency of such large installations is very high. For the strongly endothermic reaction of methane or other carbons with steam much energy is needed, which is presently generated by burning fossil fuels, leading to the emission of carbon dioxide.

In case hydrogen is produced in an other way, for example electrochemically from electricity which has been generated without emission of carbon dioxide, such as with water power, wind energy or sun energy, it is possible to produce methanol by the reaction of hydrogen with carbon dioxide which is obtainable from the air or from a more concentrated source, such as, gasification of carbon or hydrocarbons. Such a production of methanol does not lead to emission of carbon dioxide or even to a reduction of the emission of carbon dioxide.

At increased temperature and atmospheric pressure methanol can easily be converted to hydrogen and carbon monoxide. As it is possible to convert carbon monoxide with water vapour into hydrogen and carbon dioxide, methanol can easily be used to produce hydrogen. The thermodynamic equilibrium of a mixture of carbon monoxide, water, carbon dioxide and hydrogen at low temperatures is on the side of hydrogen en carbon dioxide.

Accordingly, it is possible to prevent the problems in storage and transport of hydrogen by starting from methanol and by converting methanol with steam into hydrogen and carbon dioxide.

The reactions are

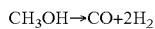

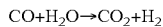

The first reaction is endothermic and the second reaction is exothermic. As the first step requires energy, in practice the decomposition cannot easily be realized.

In order to decompose methanol at a relatively low temperature, a catalyst is required. One of the most attractive catalysts for this purpose is a highly porous aluminium oxide support coated with a zinc oxide on which small copper particles have been applied. In order to decompose gaseous methanol, it is essential that thermal energy is transported to the solid catalyst. The heat conductance of a fixed bed of highly porous catalyst bodies is relatively low. Accordingly, a good heat transfer is very difficult to achieve in a fixed catalyst bed. The bad heat transfer brings about that the decomposition of methanol into carbon monoxide and hydrogen difficult to perform efficiently.

Presently the transport of thermal energy to or from a fixed catalyst bed can be done in three different ways. A first embodiment comprises accepting a relatively low conversion per pass, with a recirculation of the reactants over the catalyst bed. The gas that is fed to the reactor is heated in a separate heater before it is passed through the fixed catalyst bed. Such a process with limited conversion and recirculation of the non-converted feed is not attractive in the decomposition of methanol to carbon monoxide and hydrogen, as the non converted methanol has to be condensed and recirculated after revaporisation.

A second possibility is the use of a fluidized bed. A fluidized bed allows for a much higher heat transfer, but in such a bed it is relatively difficult to obtain full conversion. Furthermore the attrition of the catalyst particles causes problems.

he last method which is technically useful is based on the same system as used in the production of ethylene oxide, namely the use of a large number of tubes in which the catalyst has been installed. It will be clear that a reactor having a large number of such pipes is expensive and calls for a very careful insertion of the catalyst bodies to ascertain that the pressure drop is the same over each pipe.

Taking into account the intended utilization of fuel cells, namely mobile and small scale equipment, it is clear that there is a need for relatively small installations. The three possible systems discussed above are therefore not very attractive.

Accordingly it is an object of the invention to provide a process for producing hydrogen from methanol, which does not have the disadvantages of the three systems discussed above. In addition thereto it is an object of the invention to provide a process for producing hydrogen from methanol on a small scale, to be suitable for mobile applications, such as, combined with fuel cells, for instance, for automotive applications.

According to the present invention the process for producing hydrogen from methanol comprises providing at least one flow of methanol and (1) catalytically converting part of the methanol or a fuel gas with air oxygen to carbon dioxide and water, while generating heat and (2) catalytically converting the methanol or the remaining part of the methanol at elevated temperature to hydrogen and carbon monoxide, followed by conversion of the carbon monoxide with water to hydrogen and carbon dioxide, wherein the heat generated in step (1) is sufficient to produce the elevated temperature required in step (2), wherein both steps (1) and (2) are carried out in a bed of sintered metal particles, the bed of sintered metal in step (2) having a surface that is catalytically active for the conversion of methanol to hydrogen and carbon monoxide and subsequently to hydrogen, and wherein the beds of sintered metal particles are in heat exchanging relationship.

It is noted that the preparation of hydrogen from an alcohol has been described in WO 2004/035466 A1. This document relates to the use of a reformer catalyst comprising copper to produce a reforming product comprising hydrogen. It is not disclosed or suggested to carry out steps (1) and (2), as defined herein, wherein the heat generated in step (1) is sufficient to produce the elevated temperature required in step (2), wherein both steps (1) and (2) are carried out in a bed of sintered metal particles, the bed of sintered metal in step (2) having a surface that is catalytically active for the conversion of methanol to hydrogen, and wherein the beds of sintered metal particles are in heat exchanging relationship.

The sintered metal may in particular be selected from the group of copper, copper alloys, such as bronze, and nickel.

Basically the process of the invention can be carried out in two different embodiments. The selection of the specific embodiment is at least partly determined by the intended use of the gas produced by the decomposition of methanol. It can be acceptable to employ hydrogen diluted with nitrogen and carbon dioxide, for instance, when the gas flow from the methanol conversion device is passed once-through the fuel cell and the remaining gas is combusted to generate thermal energy. For household applications, in which the need for thermal energy is relatively high, once-through passing the hydrogen containing gas flow through the fuel cell is attractive. In such cases the following embodiment can be suitable. The total flow of methanol is introduced into the first compartment and combusted with air oxygen, thereby generating heat. The resulting gas flow, including carbon dioxide and nitrogen from the air, is subsequently introduced into the second step wherein the methanol is decomposed to hydrogen and carbon monoxide, followed by the catalytic reaction of carbon monoxide with steam.

In case it is essential that the hydrogen is not diluted and the carbon dioxide generated by reaction of steam with carbon monoxide is removed from the gas flow, it is much better to separate from each other the actual decomposition of the methanol and the generation of heat. In this embodiment it is essential that two separate beds are used, the first bed being to generate thermal energy in step 1 and separated from the second bed in which step 2 is performed through a heat exchanging wall.

In this embodiment it is also possible to replace the methanol to be used for combustion by a fuel gas. Of course, the use of fuel gas is generally most obvious for stationary applications, as this requires a separate source of fuel gas, whereas with the use of exclusively methanol combustion of methanol has to provide the required thermal energy. In this embodiment of the invention one can employ a bed of sintered metal bodies for step 2, having concentrically arranged around this bed the bed of sintered metal bodies for the catalytic combustion of the methanol or fuel gas. Of course it is also possible to have the combustion in the central area and the decomposition in the annular bed around the circular reactor. Other reactor configurations are of course also possible, provided that the heat conductance is sufficient between the two beds.

In the second embodiment it is important that a separate flow of water vapour is introduced for the conversion of carbon monoxide to hydrogen and carbon dioxide.

The reactor used according to the present invention can be produced using known technology for sintering metals. According to a preferred embodiment, it is possible to start from metal wires or fibres. Nickel wires with a diameter of 50 to 500 µm are commercially available. These fibres or wires may be processed into a porous metal body by dispersing a mixture of such wires and paper or cotton fibres in water. After good mixing that dispersion may be filtered through the reactor followed by treatment at elevated temperature in a hydrogen containing gas stream. The paper or carbon fibres are decomposed and a highly porous stack of metal particles filling the reactor in a homogenous manner is obtained. The decomposition of organic fibres occurs at a lower temperature than the melting of an aluminium or the aluminium alloy which brings the thermal contacts between the metal wires themselves and the reactor wall.

It is also possible to start from metal powders, such as those that are obtained by bringing molten metal in a water flow. Copper and bronze metals are commercially available as spheres. The reactor may be filled with such a powder, followed by sintering thereof. The metal particles are brought into mutual thermal contact and in thermal contact with the reactor wall. The sintering can be done by heating the loose stacking of metal spheres in a reducing gas flow. The temperature required for this depends on the metal or metal alloy. For copper or bronze bodies a temperature of about 300 to 400° C. suffices. Aluminium, of which the oxide cannot be thermally reduced, can be sintered in a high vacuum at 500 to 600° C. The aluminium weakens, whereby the weight of the aluminium bodies pushes the oxide layer on the surface away and a metallic connection between the aluminium bodies is obtained. For the use of iron spheres a much higher temperature is heated, namely about 1100° C. Stainless steel is rather difficult to sinter, as the chromium oxide on the surface is difficult to reduce with hydrogen to the corresponding alloy. Generally, the stainless steel will first be pressed into the reactor, whereby the oxide layer is removed at the contact spots and subsequently it is possible to sinter at about 1100° C.

Applying the catalyst to the surface of the porous sintered metal body can be done using standard technology. Reference is made to the international patent applications WO99/05342, WO00/20106 and WO 00/43572, the contents of which is incorporated herein by way of reference.

When using a large reactor, the weight of the porous metal body of metal spheres can become a problem. In most cases a small reactor will be used, wherein the weight of the reactor does not play a role. In case of a centralized purification of gas flows, a reactor having a large diameter may be useful in view of the pressure drop. In that case the weight of the reactor could become a problem.

A first possibility to reduce the weight of the reactor is to use a light metal having a high heat conductivity, namely aluminium. Aluminium spheres having a diameter of 2 to 5 mm are commercially available. As discussed above, these aluminium spheres can be sintered in high vacuum.

Another possibility to reduce the weight of the metal content of the reactor resides in the use of hollow spheres. Surprisingly it has been found that the thermal conductivity of the reactor is maintained even when hollow spheres are used, whereas also these slip of reactants along the reactor wall is effectively prevented.

Hollow spheres can be produced by starting from polystyrene spheres on the surface of which a layer of a powder of the metal to be used is applied. A subsequent thermal treatment in a reducing gas or reducing gas flow leads to the removal of the polystyrene and sintering of the metal powder, resulting in a hollow sphere. Sintering together of these spheres results in a reactor content having a substantially lower weight.

According to a preferred embodiment the surface of the porous sintered metal in the reactor is provided with a silicon oxide layer by the use of silicon rubber which is dried, thermally decomposed and oxidized, as discussed in the references cited above. On or in this porous dioxide layer the catalytic active component may be applied. In case the metal has to be protected against aggressive compounds which may be present in the gas flow to be treated or that may be produced by oxidation thereof, first a thin silicium oxide layer may be applied in the manner discussed above, which is subsequently sintered in an inert or reducing gas at a temperature of about 700° C. or higher to a non-porous closed layer. On top of this closed layer it is either possible to apply a porous silicium dioxide layer and therein the active component or it is possible to apply the catalytically active component directly on the closed, non-porous layer.

In a preferred embodiment a precious metal compound, such as platinum or palladium, is mixed with a solution of silicon rubber in for example ethyl acetate or diethylether. In general one will use an organometalic compound of the precious metal, as such compound can be mixed very well with the silicon rubber solution. After application on the surface of the sintered metal and removal of the organic components by oxidation, very finely divided previous metal particles are formed within the resulting silicium dioxide layer. Such precious metal particles turn out to have a very high catalytic activity.

The detailed construction of the reactor for the process of the present invention depends at least partly on the required capacity and efficiency. The heat generated by the carbon monoxide shift reaction may be used for generating the methanol vapour and steam by vaporising the methanol, the water or the methanol-water mixture, prior to the decomposition and the subsequent shift reaction. The thermal energy needed for decomposing the methanol is generated by catalytic combustion of either methanol or a fuel gas, such as natural gas. Preferably a precious metal catalyst is used for the combustion.

Before the hydrogen produced by the process of the present invention can be used in a fuel cell, all remaining carbon monoxide has to be removed from the gas flow. It is known to do this by preferential catalytic oxidation (PROX, previously referred to as 'partial oxidation'), whereby carbon monoxide is selectively reacted with oxygen, without too much hydrogen being oxidised. Usually precious metal catalysts are used for this.

Surprisingly it has been found that it is possible to very selectively oxidising the remaining carbon monoxide (with oxygen) at low temperature in the presence of water vapour using certain special, supported gold catalysts. These catalysts are based on very small (<3 nm) particles of gold metal on a support, such as titania, zirconia or iron oxide.

According to this preferred embodiment a small amount of air (oxygen) has to be added to the gas flow for the oxidation. The excess oxygen may afterwards be removed using a precious metal catalyst, such as platinum and/or palladium. At room temperature the oxygen reacts with hydrogen to water. Optionally this reaction can take place over the precious metal of a downstream fuel cell.

The addition of air requires additional equipment and in case this presents problems or is less advantageous, it is possible to convert the carbon monoxide over finely divided, supported copper oxide at a temperature of at least 160° C., preferably at about 180° C. This results in an oxidation of the carbon monoxide to carbon dioxide, while the copper oxide is reduced to metallic copper. Periodically the copper is to be regenerated to copper oxide by reoxidation. A suitable method comprises the use of two beds, one being used for the oxidation, while the other is being regenerated to copper oxide by oxidation.

The carbon dioxide present in the hydrogen can remain therein, in case the down stream application is not sensitive to the presence of carbon dioxide. In case of a fuel cell, this may require the recirculation of the used gas mixture over the fuel cell. In a preferred embodiment, carbon dioxide is removed by leading the carbon dioxide containing gas flow over decomposed hydrotalcite, more specifically a magnesium and aluminum containing hydrotalcite. Decomposition of hydrotalcite, a hydroxycarbonat of two- and tri-valent metal ions, at low temperature, results in a very reactive oxide mixture and gaseous water and carbon dioxide. When the gas flow containing carbon dioxide is passed over the oxide mixture, it reacts with carbon dioxide and water to hydrotalcite, thereby removing the carbon dioxide. Periodically the hydrotalcite has to be decomposed again, for which also a two bed system may be used.

The invention claimed is:

1. Process for producing hydrogen from methanol, comprising providing at least one flow of methanol and
   (1) catalytically converting part of the methanol or a fuel gas with air oxygen to carbon dioxide and water, while generating heat and
   (2) catalytically converting the methanol or the remaining part of the methanol at elevated temperature to hydrogen and carbon monoxide, followed by conversion of the carbon monoxide with water to hydrogen and carbon dioxide,
   wherein the heat generated in step (1) is sufficient to produce the elevated temperature required in step (2), wherein both steps (1) and (2) are each carried out in a bed of sintered metal particles, the bed of sintered metal in step (2) having a surface that is catalytically active by catalyst applied to the surface of the sintered metal for the conversion of methanol to hydrogen, and wherein the bed of sintered metal particles used in step (1) and the bed of sintered metal particles used in step (2) are in heat exchanging relationship.

2. Process according to claim 1, wherein a reactor is used comprising at least two beds of sintered metal particles, the first bed for step (1) being separated from the second bed for step (2) through a heat exchanging wall, and wherein in the first bed the conversion of methanol or fuel gas with air oxygen takes place and in the second bed the production of hydrogen from methanol occurs.

3. Process according to claim 2, wherein a separate water flow is introduced into the second bed, together with the methanol.

4. Process according to claim 1, wherein the said two steps are carried out consecutively in a first bed and a second bed downstream of the first bed and wherein methanol and air are introduced into the first bed to convert part of the methanol to generate heat for step (2), and subsequently transferring the reaction mixture containing unconverted methanol to the second bed, and wherein the two beds are in heat exchanging relationship.

5. Process according to claim 1, wherein the sintered metal is selected from the group of copper and copper alloys.

6. Process according to claim 1, wherein the temperature in the first and the second step is at least 150°.

7. Process according to claim 1, wherein the catalyst in step (1) is a precious metal catalyst.

8. Process according to claim 1, wherein the catalyst in step (2) is based on copper on zinc oxide.

9. Process according to claim 1, wherein the pressure is between about atmospheric and about 20 bar(a).

10. Process according to claim 1, wherein carbon monoxide in the hydrogen produced in step (2) is removed by catalytic oxidation.

\* \* \* \* \*

UNITED STATES PATENT AND TRADEMARK OFFICE
CERTIFICATE OF CORRECTION

PATENT NO. : 8,617,511 B2  Page 1 of 1
APPLICATION NO. : 13/203285
DATED : December 31, 2013
INVENTOR(S) : Geus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 96 days.

Signed and Sealed this

Twenty-second Day of September, 2015

Michelle K. Lee
*Director of the United States Patent and Trademark Office*